US009026133B2

(12) United States Patent
Fix et al.

(10) Patent No.: US 9,026,133 B2
(45) Date of Patent: May 5, 2015

(54) HANDSET AGENT CALIBRATION FOR TIMING BASED LOCATING SYSTEMS

(75) Inventors: Jeremy Fix, Acworth, GA (US); Francisco Martinez, Cumming, GA (US); Sheldon Kent Meredith, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 41 days.

(21) Appl. No.: 13/305,276

(22) Filed: Nov. 28, 2011

(65) Prior Publication Data
US 2013/0137465 A1 May 30, 2013

(51) Int. Cl.
H04W 24/00 (2009.01)
H04W 8/16 (2009.01)

(52) U.S. Cl.
CPC .......................................... H04W 8/16 (2013.01)

(58) Field of Classification Search
USPC .................... 455/404.2, 433, 440, 456.1, 457
See application file for complete search history.

(56) References Cited

U.S. PATENT DOCUMENTS

| | | |
|---|---|---|
| 4,718,081 A | 1/1988 | Brenig |
| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |

(Continued)

FOREIGN PATENT DOCUMENTS

| | | |
|---|---|---|
| EP | 0856746 A2 | 8/1998 |
| EP | 1145526 | 10/2001 |

(Continued)

OTHER PUBLICATIONS

Marko Silventoinen, Timo Rantalainen, "Mobile Station Locating in GSM" Helsinki, Finland, Last accessed on Nov. 15, 2011, 7 pages.

(Continued)

*Primary Examiner* — Rafael Pérez-Gutiérrez
*Assistant Examiner* — Thai Vu
(74) *Attorney, Agent, or Firm* — Amin, Turocy & Watson, LLP

(57) ABSTRACT

The systems and methods disclosed herein can implement a handset agent calibration solution that uses the GPS receivers on mobile devices to determine a location of the mobile device to calibrate timing based locating systems. The handset agent can be installed on the mobile device and can upload to an internet server the coordinates captured by the GPS receiver along with the observed time differences. The observed time differences and the location of the mobile device can be used to solve for reference time differences to calibrate unsynchronized macrocells. The reference time difference can be used to solve for the location of other mobile devices if the observed time differences between that mobile device and the macrocells are known. The solution can include receiving measurement reports from many mobile devices to obtain averaged observed time differences at a reference location to achieve more accurate reference time differences.

19 Claims, 10 Drawing Sheets

(56) References Cited

U.S. PATENT DOCUMENTS

| | | | |
|---|---|---|---|
| 6,125,125 A | 9/2000 | Narasimha et al. | |
| 6,148,219 A | 11/2000 | Engelbrecht et al. | |
| 6,216,002 B1 | 4/2001 | Holmring | |
| 6,230,018 B1 | 5/2001 | Watters et al. | |
| 6,256,577 B1 | 7/2001 | Graunke | |
| 6,263,190 B1 | 7/2001 | Mamori et al. | |
| 6,298,233 B1 | 10/2001 | Souissi et al. | |
| 6,307,503 B1 | 10/2001 | Liu et al. | |
| 6,311,078 B1 | 10/2001 | Hardouin | |
| 6,317,686 B1 | 11/2001 | Ran | |
| 6,330,459 B1 | 12/2001 | Crichton et al. | |
| 6,351,235 B1 | 2/2002 | Stilp | |
| 6,353,778 B1 | 3/2002 | Brown et al. | |
| 6,397,074 B1 | 5/2002 | Pihl et al. | |
| 6,405,047 B1 | 6/2002 | Moon | |
| 6,407,703 B1 | 6/2002 | Minter et al. | |
| 6,429,815 B1 | 8/2002 | Soliman | |
| 6,434,396 B1 | 8/2002 | Rune | |
| 6,449,486 B1 | 9/2002 | Rao | |
| 6,453,168 B1 | 9/2002 | McCrady et al. | |
| 6,493,539 B1 | 12/2002 | Falco et al. | |
| 6,515,623 B2 | 2/2003 | Johnson | |
| 6,522,296 B2 | 2/2003 | Holt | |
| 6,526,335 B1 | 2/2003 | Treyz et al. | |
| 6,552,682 B1 | 4/2003 | Fan | |
| 6,560,532 B2 | 5/2003 | Cayford | |
| 6,560,567 B1 | 5/2003 | Yechuri et al. | |
| 6,594,576 B2 | 7/2003 | Fan et al. | |
| 6,604,083 B1 | 8/2003 | Bailey et al. | |
| 6,668,226 B2 | 12/2003 | Sutanto et al. | |
| 6,690,292 B1 | 2/2004 | Meadows et al. | |
| 6,744,383 B1 | 6/2004 | Alfred et al. | |
| 6,744,740 B2 | 6/2004 | Chen | |
| 6,757,545 B2 | 6/2004 | Nowak et al. | |
| 6,801,782 B2 | 10/2004 | McCrady et al. | |
| 6,801,855 B1 | 10/2004 | Walters et al. | |
| 6,816,782 B1 | 11/2004 | Walters et al. | |
| 6,850,761 B2 | 2/2005 | Pallonen | |
| 6,892,054 B2 | 5/2005 | Belcher et al. | |
| 6,933,100 B2 | 8/2005 | Igawa et al. | |
| 6,933,860 B1 | 8/2005 | Gehman et al. | |
| 7,058,710 B2 | 6/2006 | McCall et al. | |
| 7,065,349 B2 | 6/2006 | Nath et al. | |
| 7,098,805 B2 | 8/2006 | Meadows et al. | |
| 7,113,793 B2 | 9/2006 | Veerasamy et al. | |
| 7,149,534 B2 | 12/2006 | Bloebaum et al. | |
| 7,181,218 B2 | 2/2007 | Ovesjo et al. | |
| 7,277,049 B2 | 10/2007 | Korneluk et al. | |
| 7,289,039 B2 | 10/2007 | Kato et al. | |
| 7,346,359 B2 | 3/2008 | Damarla et al. | |
| 7,359,719 B1 * | 4/2008 | Duffett-Smith et al. | ... 455/456.6 |
| 7,366,492 B1 | 4/2008 | Ganesh | |
| 7,375,649 B2 | 5/2008 | Gueziec | |
| 7,420,464 B2 | 9/2008 | Fitzgerald et al. | |
| 7,432,829 B2 | 10/2008 | Poltorak | |
| 7,436,794 B2 | 10/2008 | Takahashi et al. | |
| 7,463,143 B2 | 12/2008 | Forr et al. | |
| 7,508,321 B2 | 3/2009 | Gueziec | |
| 7,664,492 B1 | 2/2010 | Lee et al. | |
| 7,696,922 B2 | 4/2010 | Nicholson et al. | |
| 7,697,917 B2 | 4/2010 | Camp et al. | |
| 7,706,964 B2 | 4/2010 | Horvitz et al. | |
| 7,744,740 B2 | 6/2010 | Diehl | |
| 7,747,258 B2 | 6/2010 | Farmer et al. | |
| 7,761,225 B2 | 7/2010 | Vaughn | |
| 7,831,380 B2 | 11/2010 | Chapman et al. | |
| 7,848,880 B2 | 12/2010 | Cheung | |
| 7,890,299 B2 | 2/2011 | Fok et al. | |
| 7,917,156 B2 | 3/2011 | Sheynblat et al. | |
| 7,945,271 B1 | 5/2011 | Barnes et al. | |
| 7,958,001 B2 | 6/2011 | Abbadessa et al. | |
| 7,962,162 B2 | 6/2011 | McNair | |
| 7,962,280 B2 | 6/2011 | Kindo et al. | |
| 7,994,981 B1 | 8/2011 | Farrokhi et al. | |
| 7,996,020 B1 | 8/2011 | Chhabra | |
| 8,000,726 B2 | 8/2011 | Altman et al. | |
| 8,005,050 B2 | 8/2011 | Scheinert et al. | |
| 8,010,164 B1 | 8/2011 | Sennett et al. | |
| 8,036,822 B2 | 10/2011 | Ho et al. | |
| 8,054,802 B2 | 11/2011 | Burgess et al. | |
| 8,065,185 B2 | 11/2011 | Foladare et al. | |
| 8,098,152 B2 | 1/2012 | Zhang et al. | |
| 8,121,604 B1 | 2/2012 | Schwinghammer | |
| 8,126,479 B2 | 2/2012 | Morrison | |
| 8,140,079 B2 | 3/2012 | Olson | |
| 8,193,984 B2 | 6/2012 | Ward et al. | |
| 8,194,589 B2 | 6/2012 | Wynn et al. | |
| 8,195,175 B2 | 6/2012 | Govindan et al. | |
| 8,224,349 B2 | 7/2012 | Meredith et al. | |
| 8,253,559 B2 | 8/2012 | Howard et al. | |
| 8,254,959 B2 | 8/2012 | Fix et al. | |
| 8,264,956 B2 | 9/2012 | Ramankutty et al. | |
| 8,270,933 B2 | 9/2012 | Riemer et al. | |
| 8,280,438 B2 | 10/2012 | Barbera et al. | |
| 8,295,854 B2 | 10/2012 | Osann et al. | |
| 8,307,030 B1 | 11/2012 | Hu | |
| 8,326,682 B2 | 12/2012 | Redford et al. | |
| 8,355,364 B1 | 1/2013 | Vargantwar et al. | |
| 8,355,865 B2 | 1/2013 | Wagner et al. | |
| 8,417,264 B1 | 4/2013 | Whitney et al. | |
| 8,548,494 B2 | 10/2013 | Agarwal et al. | |
| 8,572,198 B2 | 10/2013 | Jhanji | |
| 8,594,700 B2 | 11/2013 | Nabbefeld | |
| 8,611,919 B2 | 12/2013 | Barnes | |
| 8,666,388 B2 | 3/2014 | Catovic et al. | |
| 8,666,390 B2 | 3/2014 | Meredith et al. | |
| 2001/0047242 A1 | 11/2001 | Ohta | |
| 2002/0059266 A1 | 5/2002 | I'anson et al. | |
| 2002/0069312 A1 | 6/2002 | Jones | |
| 2002/0077116 A1 | 6/2002 | Havinis et al. | |
| 2002/0172223 A1 | 11/2002 | Stilp et al. | |
| 2003/0092448 A1 | 5/2003 | Forstrom et al. | |
| 2003/0097330 A1 | 5/2003 | Hillmer et al. | |
| 2003/0115260 A1 | 6/2003 | Edge | |
| 2003/0125046 A1 | 7/2003 | Riley et al. | |
| 2003/0158924 A1 | 8/2003 | DeLegge | |
| 2003/0222819 A1 | 12/2003 | Karr et al. | |
| 2003/0225508 A9 | 12/2003 | Petzld et al. | |
| 2004/0024639 A1 | 2/2004 | Goldman | |
| 2004/0067759 A1 * | 4/2004 | Spirito et al. | ... 455/456.1 |
| 2004/0082338 A1 | 4/2004 | Norrgard et al. | |
| 2004/0127191 A1 | 7/2004 | Matsunaga | |
| 2004/0131036 A1 | 7/2004 | Walsh | |
| 2004/0155814 A1 | 8/2004 | Bascobert | |
| 2004/0172190 A1 | 9/2004 | Tsunehara et al. | |
| 2004/0219930 A1 | 11/2004 | Lin | |
| 2004/0224698 A1 | 11/2004 | Yi et al. | |
| 2004/0267561 A1 | 12/2004 | Meshkin et al. | |
| 2005/0007993 A1 | 1/2005 | Chambers et al. | |
| 2005/0039056 A1 | 2/2005 | Bagga et al. | |
| 2005/0053099 A1 | 3/2005 | Spear et al. | |
| 2005/0136911 A1 | 6/2005 | Csapo et al. | |
| 2005/0239410 A1 | 10/2005 | Rochester | |
| 2005/0272445 A1 | 12/2005 | Zellner et al. | |
| 2005/0276385 A1 | 12/2005 | McCormick et al. | |
| 2006/0030333 A1 | 2/2006 | Ward et al. | |
| 2006/0046744 A1 | 3/2006 | Dublish et al. | |
| 2006/0075131 A1 | 4/2006 | Douglas et al. | |
| 2006/0089153 A1 | 4/2006 | Sheynblat | |
| 2006/0240839 A1 * | 10/2006 | Chen et al. | ... 455/456.1 |
| 2006/0267841 A1 | 11/2006 | Lee et al. | |
| 2006/0270419 A1 | 11/2006 | Crowly et al. | |
| 2006/0282660 A1 | 12/2006 | Varghese et al. | |
| 2007/0001873 A1 | 1/2007 | Ishikawa et al. | |
| 2007/0060130 A1 | 3/2007 | Gogic et al. | |
| 2007/0176749 A1 | 8/2007 | Boyd | |
| 2007/0213074 A1 | 9/2007 | Fitch et al. | |
| 2007/0217375 A1 | 9/2007 | Zampiello et al. | |
| 2007/0217379 A1 | 9/2007 | Fujiwara et al. | |
| 2007/0293157 A1 | 12/2007 | Haartsen et al. | |
| 2007/0298807 A1 | 12/2007 | Yarkosky | |
| 2008/0004789 A1 | 1/2008 | Horvitz et al. | |
| 2008/0010365 A1 | 1/2008 | Schneider | |
| 2008/0039114 A1 | 2/2008 | Phatak et al. | |

(56) References Cited

U.S. PATENT DOCUMENTS

| | | |
|---|---|---|
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1* | 4/2008 | Brunner et al. ............... 455/437 |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0058442 A1 | 3/2010 | Costa et al. |
| 2010/0081389 A1 | 4/2010 | Lawrow |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0299060 A1 | 11/2010 | Snavely et al. |
| 2010/0311437 A1* | 12/2010 | Palanki et al. ............. 455/456.1 |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Choi-Grogan |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182874 A1 | 7/2012 | Siomina et al. |
| 2012/0185309 A1 | 7/2012 | Kakarla et al. |
| 2012/0287911 A1 | 11/2012 | Takano et al. |
| 2012/0317500 A1 | 12/2012 | Kosseifi et al. |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0096966 A1 | 4/2013 | Barnes |
| 2013/0137464 A1 | 5/2013 | Kramer et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0122220 A1 | 5/2014 | Bradley et al. |
| 2014/0171060 A1 | 6/2014 | Cook et al. |
| 2014/0278744 A1 | 9/2014 | Lo Faro et al. |

FOREIGN PATENT DOCUMENTS

| | | |
|---|---|---|
| JP | 2004069609 A | 3/2004 |
| JP | 2007328050 A | 12/2007 |
| WO | WO2006031035 A1 | 3/2006 |

OTHER PUBLICATIONS

Notice of Allowance dated Aug. 21, 2014 for U.S. Appl. No. 13/447,069, 78 pages.

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

New Devices Aim to Disable Cell Phones While Driving. FOXNews. com, Jan. 18, 2009. http://www.foxnews.com/printer_friendly_story/0,3566,480585,00.html. Last accessed Nov. 24, 2010, 2 pages.

(56) References Cited

OTHER PUBLICATIONS

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summaiy?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory. MobiSys'11, Jun. 28-Jul. 1, 2011, Bethesda, Maryland, USA. 14 pages.
Bitcarrier Technology. Published online at http://www.bitcarrier.com/technology. Retrieved Aug. 15, 2011, 1 page.
Hao Peng, Ban Xuegang(Jeff). Estimating Vehicle Position in a Queue at Signalized Intersections Using Simple Travel Times from Mobile Sensors. Retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).

(56) References Cited

OTHER PUBLICATIONS

Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Rabinowitz, et al., A new positioning system using television synchronization signals, IEEE Transactions on Broadcasting, vol. 51(1), p. 51-61, Mar. 2005.
Interview Summary dated Feb. 3, 2014 for U.S. Appl. No. 13/188,136, 10 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) Utran Iu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Office Action dated Mar. 25, 2014 for U.S. Appl. No. 13/488,144, 60 Pages.
Office Action dated Dec. 30, 2013 for U.S. Appl. No. 13/305,267, 10 pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21st century dictionary. Retrieved on May 9, 2014 from http://search.credoreference.com/content/entry/chambdict/represent/0.
Represent. (2011). In the american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.

(56) References Cited

OTHER PUBLICATIONS

Office Action dated Dec. 1, 2014 for U.S. Appl. No. 13/495,756, 76 pages.
Office Action dated Jan. 7, 2015 for U.S. Appl. No. 13/557,425, 30 pages.
Girardin, et al., "Digital footprinting: Uncovering tourists with user generated content." Pervasive Computing, IEEE 7.4, Oct.-Nov. 2008. 8 pages.
Stein Field, "The development of location based services in mobile commerce." ELife after the Dot Corn Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, Nov. 3, 2005. 10 pages.
Ratti, et al. "Mobile Landscapes: using location data from cell phones for urban analysis." Environment and Planning B: Planning and Design, vol. 33, 2006, 23 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Office Action dated Feb. 13, 2015 for U.S. Appl. No. 13/188,136, 44 pages.

\* cited by examiner

HANDSET AGENT CALIBRATION FOR TIMING BASED LOCATING SYSTEMS

TECHNICAL FIELD

The subject disclosure relates to wireless communications, and more particularly, to calibrating timing based locating systems using a handset agent in a wireless environment.

BACKGROUND

Accurately locating mobile devices that are active on a network is beneficial not just to mobile device users, but also to the network operator. If the network operators know the precise locations of the mobile devices, many services can be offered that would not otherwise be possible. Such services can include: dynamic provisioning of coupons as mobile device users pass in front of retail stores; marketing; analyzing traffic flow and routes; and analyzing network performance issues. Network performance issues can include poor coverage areas and dropped calls. Knowing the precise location of where network performance issues are occurring can be beneficial in troubleshooting and solving the issues.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later. It will also be appreciated that the detailed description may include additional or alternative embodiments beyond those described in this summary.

In various non-limiting embodiments, systems and methods are provided to calibrate timing measurements from macrocells to locate mobile devices more accurately. In an example embodiment, a method comprises receiving measurement reports identifying the location of a first mobile device and providing observed time differences for signals sent between the first mobile device and macrocells in range of the first mobile device. The method can also include translating the observed time differences at the location of the first mobile device to a first set of translated observed time differences that correspond to a reference location and calculating reference time differences for the macrocells using the reference location and the first set of translated observed time differences. The method can also include receiving observed time differences of signals received at a second mobile device and solving for a location of the second mobile device in response to the observed time differences of signals and the reference time difference of the macrocells.

In another example embodiment, a system can comprise a collection component configured to collect a measurement report that identifies a location of a first mobile device and provides observed time differences for signals sent to the first mobile device from macrocells in range of the first mobile device. The system can also comprise a translation component configured to translate the observed time differences at the location of the first mobile device to a first set of translated observed time difference that correspond to a reference location. The system can also include a calibration component that is configured to generate reference time differences that correspond to a reference location. The collection component can also be configured to collect observed time differences of signals between a second mobile device and the macrocells, and a location component can be configured to determine a location of the second mobile device in response to the observed time differences of signals for the second mobile device and the reference time differences.

In another example embodiment, a computer-readable storage medium having stored thereon computer-executable instructions, that in response to execution, cause a system to perform operations comprising receiving measurement reports identifying the location of a first mobile device and providing observed time differences for signals sent between the first mobile device and macrocells in range of the first mobile device. The operations can also include translating the observed time differences at the location of the first mobile device to a first set of translated observed time differences that correspond to a reference location and calculating reference time differences for the macrocells using the reference location and the first set of translated observed time differences.

The following description and the annexed drawings set forth certain illustrative aspects of the specification. These aspects are indicative, however, of but a few of the various ways in which the principles of the specification may be employed. Other novel features of the specification will become apparent from the following detailed description of the specification when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
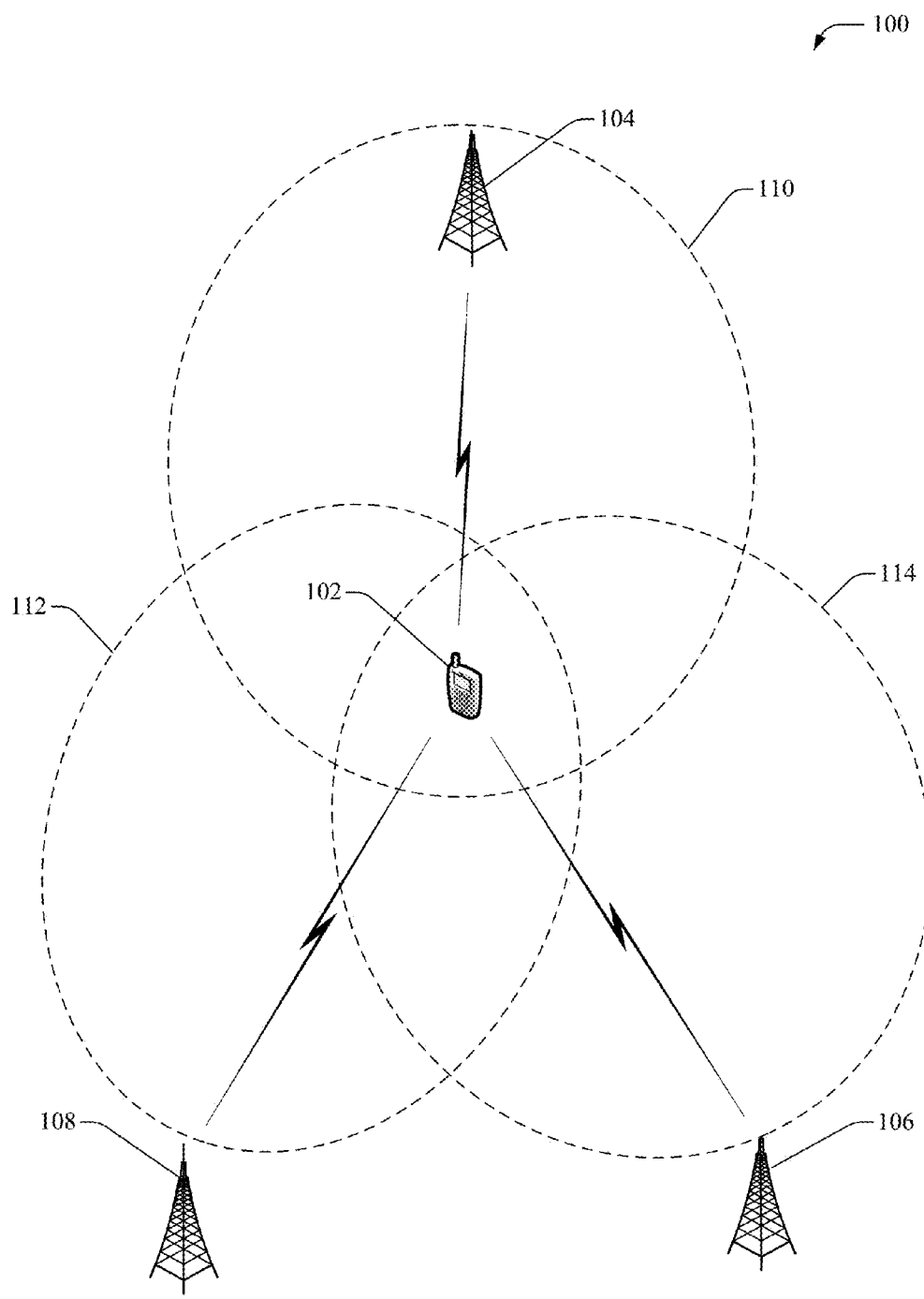
FIG. 1 illustrates an example, non-limiting embodiment of a system that can facilitate measuring observed time differences at a known location in accordance with the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" and/or "exemplary" is used herein to mean serving as an example, instance, or illustration. Any aspect or design described herein as "example" and/or "exemplary" is not necessarily construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

The systems and methods disclosed herein can implement a handset agent calibration solution that uses the GPS receivers on mobile devices to determine a location of the mobile device to calibrate timing based locating systems. The handset agent can be installed on the mobile device and can upload to an internet server the coordinates captured by the GPS receiver along with the observed time differences for signals sent to the mobile device from macrocells in range of the mobile device. The observed time differences and the location of the mobile device can be used to solve for a reference time difference that accounts for the timing differences of the unsynchronized macrocells. While the term of art "observed time difference" is used herein, the word "observed" should not be considered a restriction on how the observation takes place. The reference time difference can be used to solve for the location of other mobile devices if the observed time differences between that mobile device and the macrocells are known. The solution can include receiving measurement reports from many mobile devices to obtain averaged observed time differences at a reference location to achieve more accurate reference time differences.

Aspects or features of the subject embodiments can be exploited in substantially any wireless communication technology; e.g., Universal Mobile Telecommunications System (UMTS), Code division multiple access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects of the subject embodiments can be exploited in legacy telecommunication technologies.

Turning now to FIG. 1, there is illustrated an example, non-limiting system 100 that can facilitate measuring observed time differences at a known location in accordance with the subject disclosure. Included in system 100 is a mobile device 102 with a built in GPS receiver. System 100 can also include macrocells 104, 106, and 108 that can have overlapping coverage areas 110, 112, and 114. Mobile device 102, which can be located in an area that is covered by macrocells 104, 106, and 108, can send and receive communication signals from each of the three macrocells.

It is to be appreciated that while FIG. 1 shows mobile device 102 within range of three macrocells, any number of macrocells is possible depending on the physical location. In some geographic locations, the number of macrocells could be as high as 10-15. Additionally, it is also to be appreciated that the reference to "macrocells" as used herein is an example of a cellular base station. A person of ordinary skill in the art would appreciate that any suitable cellular base station with a range of transmitting powers, including, but not limited to microcells and picocells could be employed as well.

Mobile device 102 can have a handset agent installed on the mobile device. The handset agent can compile information collected from the phone and upload the data to an internet server via the data connection on mobile device 102.

Macrocells 104, 106, and 108, can be configured to send out regular signals that can be received by mobile devices in range of macrocells. The signals can be received and processed by the mobile devices independent of a call. In this way, the network based locating system can operate using network overhead resources that can be cheaper and less resource intensive than communications sent over an application layer datalink.

The signals can contain code that can identify the macrocell that sent the signal. Each macrocell can have a unique signature, so that the signal can be positively identified as belonging to a specific macrocell. The mobile device 102 can analyze the signals when they are received, and compare the times of receipt. When signals arrive at different times that can indicate that the signals had different distances to travel, and thus the relative distances of the macrocells can be determined. These time differences are the observed time differences and there can be an observed time difference for each macrocell within range of mobile device 102.

In the exemplary system 100 shown in FIG. 1, there can be three observed time differences for signals sent between macrocells 104, 106, 108, and mobile device 102. Since macrocells 104, 106, and 108 are unsynchronized however, the observed time differences, if used in multilateration or triangulation to locate mobile device 102, would yield a result that would be accurate to between +/−200-500 m. However, using the known location of the mobile device, the observed time differences can be calibrated (See FIG. 2), to much more accurately locate a mobile device (See FIGS. 4 and 5).

The handset agent on mobile device 102 can compile the observed time differences into a data file that includes a Radio Resource Control (RRC) measurement report that includes the primary scrambling code of the macrocell, strength of the signal, and the timing measurement. The handset agent can also include in the data file the coordinates received from the GPS receiver on mobile device 102. This data file can be uploaded using the data/internet connection on mobile device 102 to an internet server, which can forward the data file to the core network.

Figure 2:
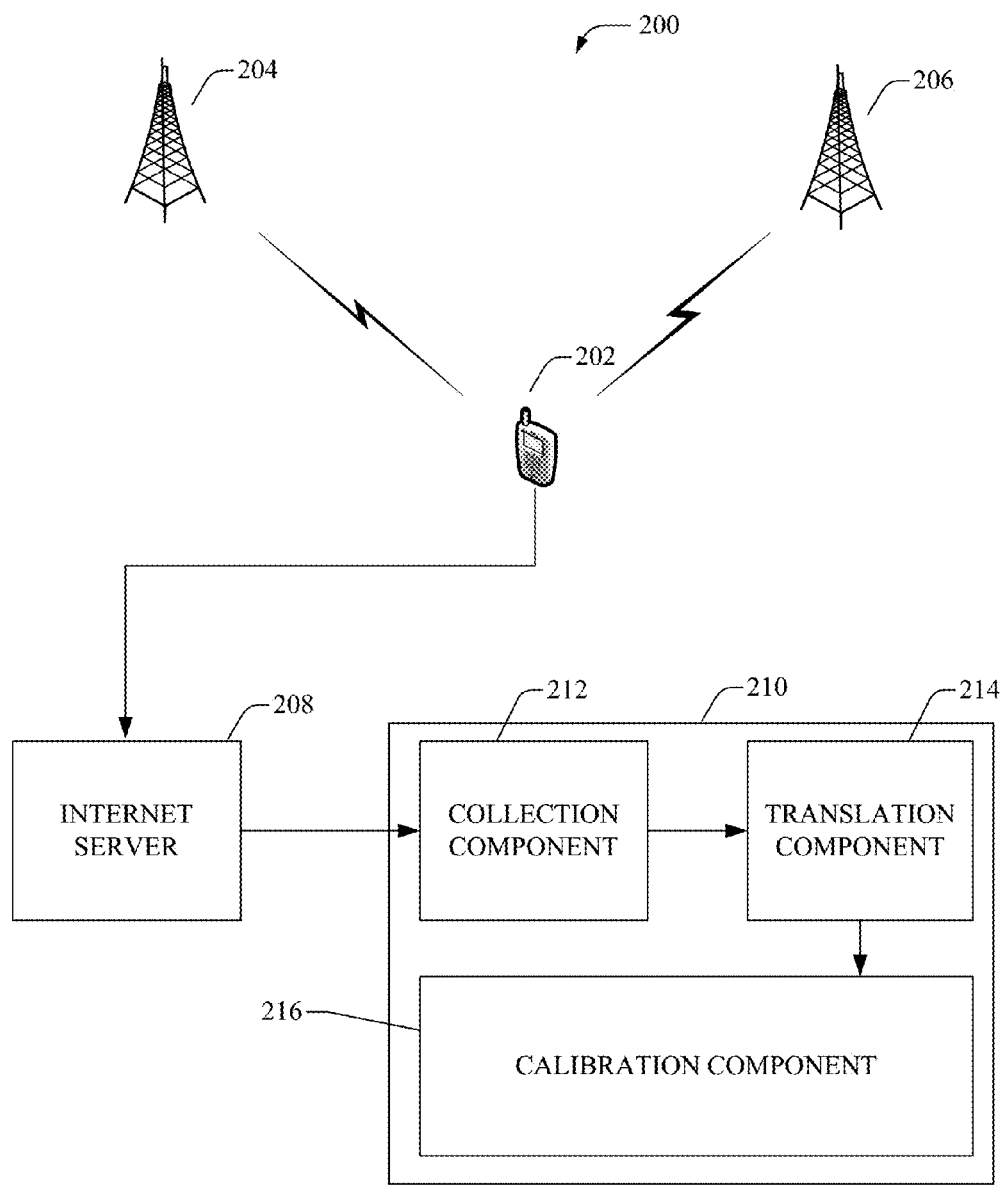
FIG. 2 illustrates an example, non-limiting embodiment of a system that can calibrate timing based location solutions and create a reference time difference in accordance with the subject disclosure.

Turning now to FIG. 2, an example, non-limiting embodiment of a system that can calibrate timing based location solutions and create a reference time difference is shown. Included in system 200 can be a mobile device 202 that can be provided to receive signals from macrocells 204 and 206 and measure the observed time differences between macrocells 204 and 206 and mobile device 202. A GPS unit on mobile device 202 can be used to provide the location of mobile device 202. A handset agent on mobile device 202 can be used to compile a data file that includes the observed time differences and the location and upload the data file to internet server 208

A collection component 212 in core network 210 can be provided to collect the location information and the observed time differences from internet server 208. A translation component 214 can translate the observed time differences at the mobile device 202 to observed time differences that correspond to a reference location. A calibration component 216 can be provided to calculate a reference time difference for the macrocell 206 in using the location information and the translated observed time differences.

It is to be appreciated that while FIG. 2 shows two macrocells, any number of macrocells is possible. Indeed, the data file retrieved by collection component 212 from internet server 208 can include as many as 10-15 observed time differences corresponding to as many discrete macrocells.

The handset agent on mobile device 202 can upload the data file including the measurement report and the location of the mobile device to internet server 208 using the data connection on mobile device 202. The handset agent can also include information that identifies the mobile device, such as the IMSI and MSISDN numbers associated with the mobile device, as well as other identifying information.

Collection component 212 can obtain the data file that includes the observed time differences and the location of the mobile device from internet server 208. The observed time differences from mobile device 202 can be in the form of an RRC measurement report. The RRC measurement report can include the primary scrambling code of the macrocells, strength of the signals, and the timing measurements for each of the macrocells within range of mobile device 202. The primary scrambling code can identify the macrocell. Upon determining the identities of macrocells 204 and 206, collection component 214 can also obtain the location of the macrocells from a data store in the core network.

Translation component 214 can translate the observed time differences received by mobile device 202 into observed time differences that correspond to a reference location. Since the location of the macrocells 204 and 206, the mobile device 202, and the reference location are known, it is possible to calculate what the observed time differences would between the macrocells and a virtual mobile device at the reference location. The translated observed time differences can thus be virtual observed time differences. This is shown in more detail in FIG. 3.

With the known reference location, and the locations of the macrocells, calibration component 216 can calculate reference time differences using the translated observed time differences. Since the location of the reference location is known in relation to the mobile devices 308 and 310, and the location of the macrocells are known as well, the observed time differences can be translated to virtual observed time differences for virtual signals that would have been observed if there was a mobile device at the reference location.

Calibration component 216 can determine the distance between the macrocells and the reference location. Since signals between the macrocells and reference location travel at a known and constant speed c, the expected time it takes for a signal from each macrocell to arrive at the reference location can be determined. Calibration component 216 can then use the expected time to determine the deviation of the signals from a baseline. This deviation is the reference time difference which can compensate for the unsynchronized signals from the macrocells. The reference time differences can then be used to accurately locate another mobile device, shown in more detail in FIGS. 4 and 5.

In an embodiment, collection component 212 can be configured to obtain multiple observed time differences and measurement reports for multiple mobile devices. The translation component 214 can translate the observed time differences for the many mobile devices to a reference location, and the calibration component 216 can average the translated observed time differences to obtain more accurate reference time differences for the macrocells.

Figure 3:
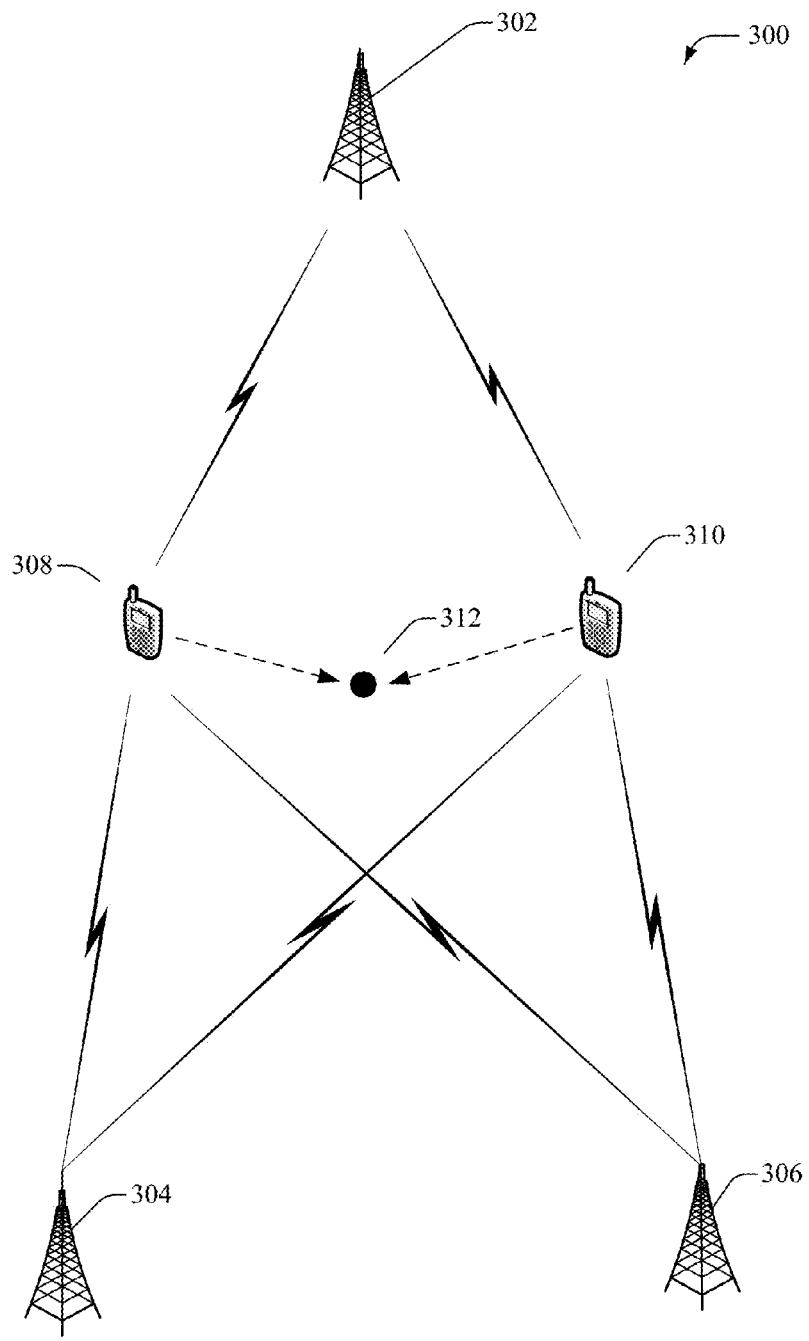
FIG. 3 illustrates an example, non-limiting embodiment of a system with translated observed time differences corresponding to a reference location in accordance with the subject disclosure.

Turning now to FIG. 3, an example, non-limiting embodiment of a system 300 with translated observed time differences corresponding to a reference location in accordance with the subject disclosure is shown. Included in system 300 can be mobile devices 308 and 310 in communication with macrocells 302, 304, and 306. Each of the mobile devices 308 and 310 can be in communication with each of the macrocells.

Macrocells 302, 304, and 306 can be configured to send out regular signals that can be received by mobile devices 308 and 310. The signals can be received and processed by the mobile devices independent of a call. In this way, the network based locating system can operate using network overhead resources that can be cheaper and less resource intensive than communications sent over an application layer datalink.

The signals can contain code that can identify the macrocell that sent the signal. Each macrocell can have a unique signature, so that the signal can be positively identified as belonging to a specific macrocell. The mobile devices 308 and 310 can analyze the signals when they are received, and compare the times of receipt. When signals arrive at different times that can indicate that the signals had different distances to travel, and thus the relative distances of the macrocells can be determined. These time differences are the observed time differences and there can be observed time differences between each macrocell and each mobile device.

In order to increase the accuracy of the reference time differences and in turn increase the accuracy of the timing based locating system, the observed time differences can be combined and averaged. To do that, a reference location 312 can be defined, and a function can be applied to translate the observed time differences for mobile devices 308 and 310 to virtual observed time differences that correspond to the reference location. Since the location of the reference location is known in relation to the mobile devices 308 and 310, and the location of the macrocells are known as well, the observed time differences can be translated to virtual observed time differences for virtual signals that would have been observed if there was a mobile device at the reference location.

It should be appreciated that while FIG. 3 shows two mobile devices and three macrocells, there can be any number and combination of mobile devices and macrocells. In some locations, the number of observable macrocells can be as high as 10-15, and the number of mobile devices with handset agents that can capture the observed time differences can be far greater than the number shown in FIG. 3. By translating all of the observed time differences to the reference location and averaging them, highly accurate reference time differences can be calculated by the calibration component 216 shown in FIG. 2.

Figure 4:
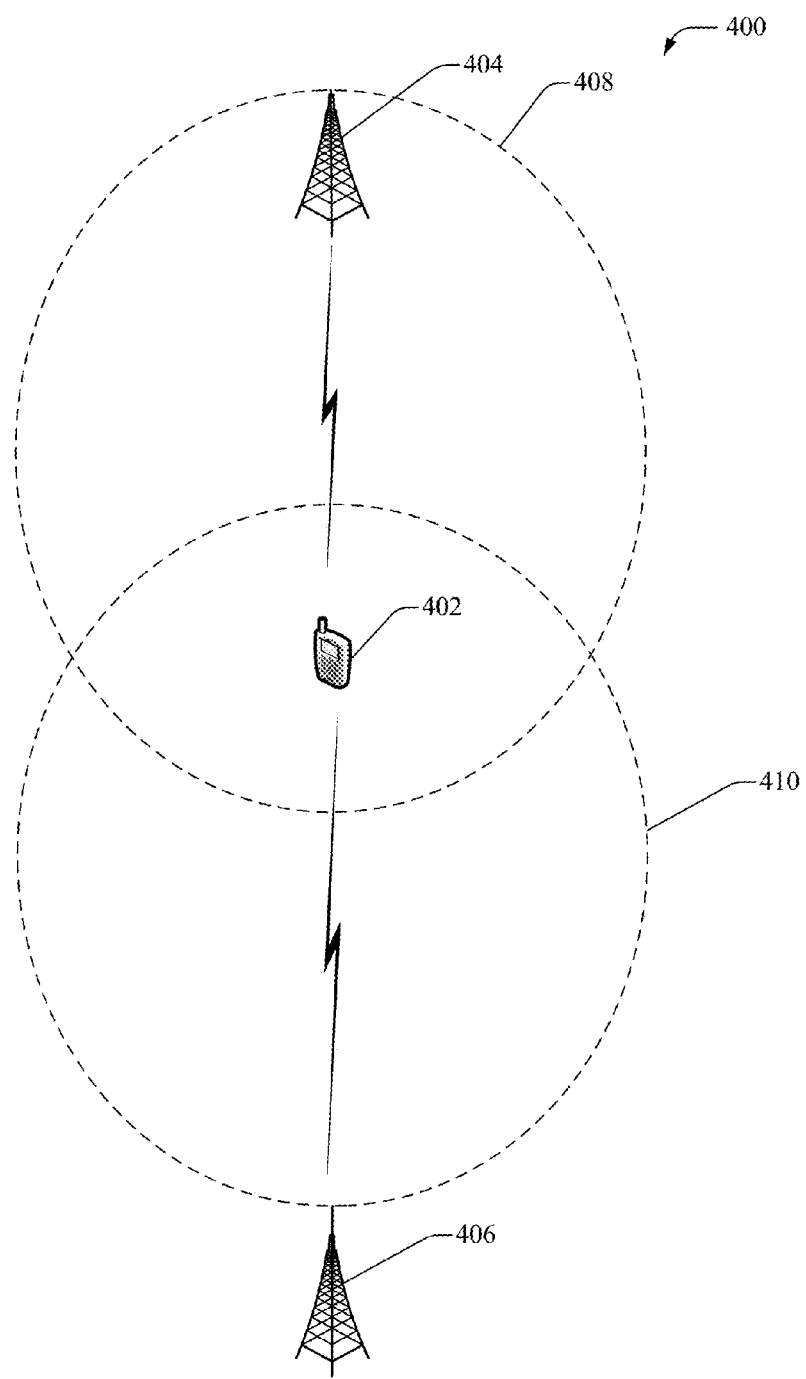
FIG. 4 illustrates an example, non-limiting embodiment of a system that can measure observed time differences at a mobile device in accordance with the subject disclosure.

Turning now to FIG. 4, an example, non-limiting embodiment of a system 400 that can measure observed time differences at a mobile device is shown. Mobile device 402 can be provided to measure observed time differences from macrocells 404 and 406. Mobile device 402 can be a mobile device with or without a GPS receiver. Macrocells 404 and 406 can have overlapping ranges 408 and 410 respectively. Mobile device 402 can measure the observed time differences between mobile device 402 and whichever macrocell ranges mobile device 402 is located in.

It is to be appreciated that while FIG. 4 shows mobile device 402 within range of two macrocells, any number of macrocells is possible depending on the physical location. In urban, or semi urban areas, the number of macrocells could be as high as 10-15.

Macrocells 404 and 406 can be configured to send out regular signals that can be received by mobile devices in range of macrocells. The signals can be received and processed by the mobile devices independent of a call. In this way, the network based locating system can operate using network overhead resources that can be cheaper and less resource intensive than communications sent over an application layer data link.

The signals can contain code that can identify the macrocell that sent the signal. Each macrocell can have a unique signature, so that the signal can be positively identified as belonging to a particular macrocell. The mobile device 402 can analyze the signals when received, and compare the times of receipt. When signals arrive at different times that can indicate that the signals had different distances to travel, and thus the relative distances of the macrocells can be determined. These time differences are the observed time differences and there can be an observed time difference for each macrocell within range of mobile device 404.

Figure 5:
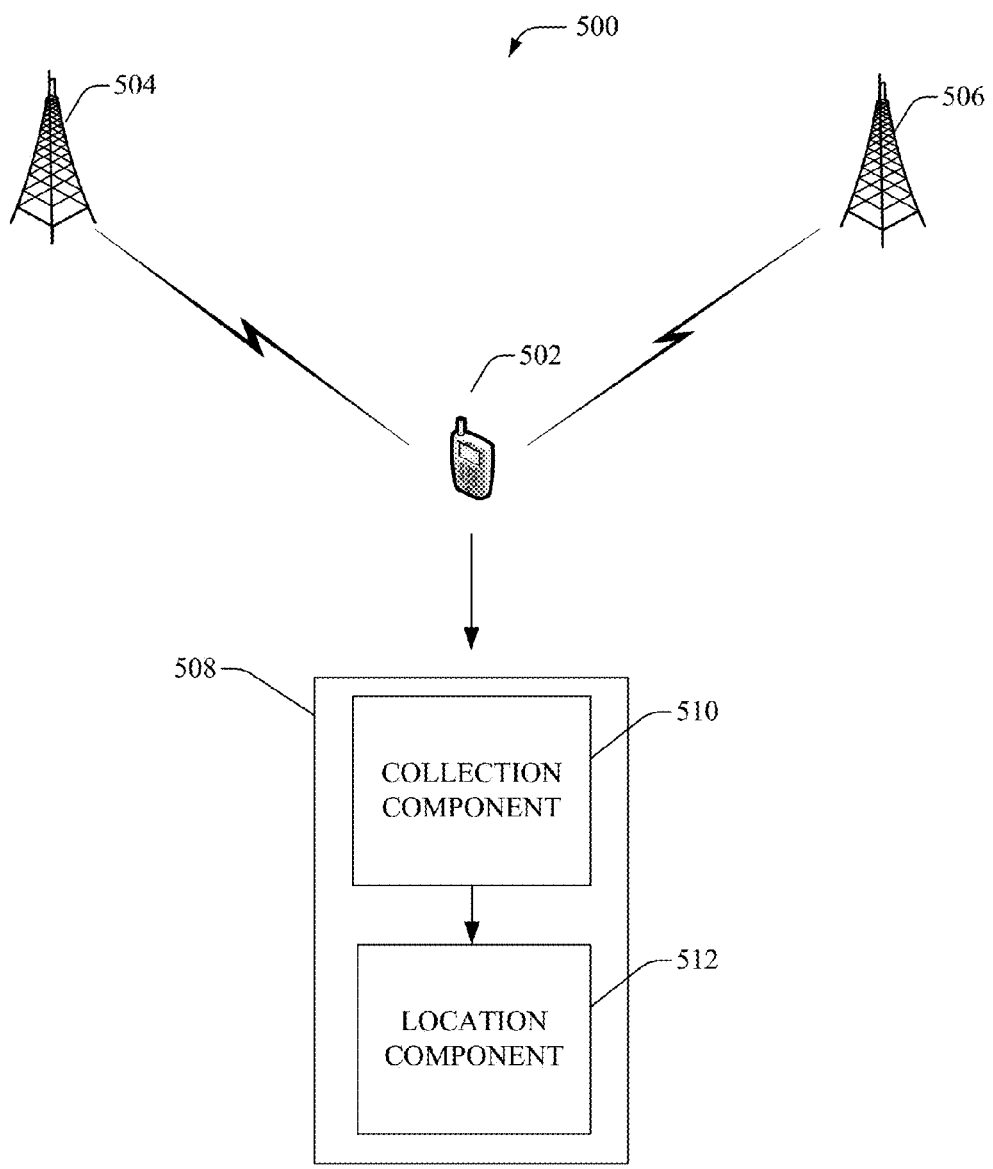
FIG. 5 illustrates an example, non-limiting embodiment of a system that can locate a mobile device in accordance with the subject disclosure.

Turning now to FIG. 5, an example, non-limiting embodiment of a system 500 that can locate a mobile device is shown. A mobile device 502 that has determined observed time differences from macrocells 504 and 506 can forward the observed time differences to core network 508. Collection component 510 can receive the observed time differences and the locations of the macrocells 504 and 506, and can forward the information to location component 512. Location component 512 can use the information collected as well as the reference time differences that correspond to the macrocells to determine the location of mobile device 502.

Collection component 510 can obtain the observed time differences from mobile device 502 in the form of an RRC measurement report. The RRC measurement report can include the primary scrambling code of the macrocell, strength of the signal, and the timing measurement. The primary scrambling code can identify the macrocell. Upon determining the identity of macrocells 504 and 506, collection component 510 can obtain the location of macrocells 504 and 506 from a database stored in the core network. Collection component 510 can retrieve the RRC measurement report from mobile device 402 via one of the macrocells, using network overhead resources.

The reference time differences can show the relative signal delay for each of the macrocells. Subtracting the reference time differences from the observed time differences can yield actual time differences for signals sent between the macrocells and the mobile device 502. With the actual time difference and the known locations of macrocells 504 and 506, it can be possible to use multilateration or hyperbolic positioning which uses time difference on arrival (TDOA) equations to solve for the location of mobile device 502.

Location component 512 can determine the position of any mobile device to within a similar degree of accuracy as the GPS receivers which provided the coordinates of the other mobile devices during the calibration phase. As observed time differences from additional mobile devices are retrieved and averaged, and new reference time differences obtained, the accuracy of the location component 512 can increase.

Figure 6:
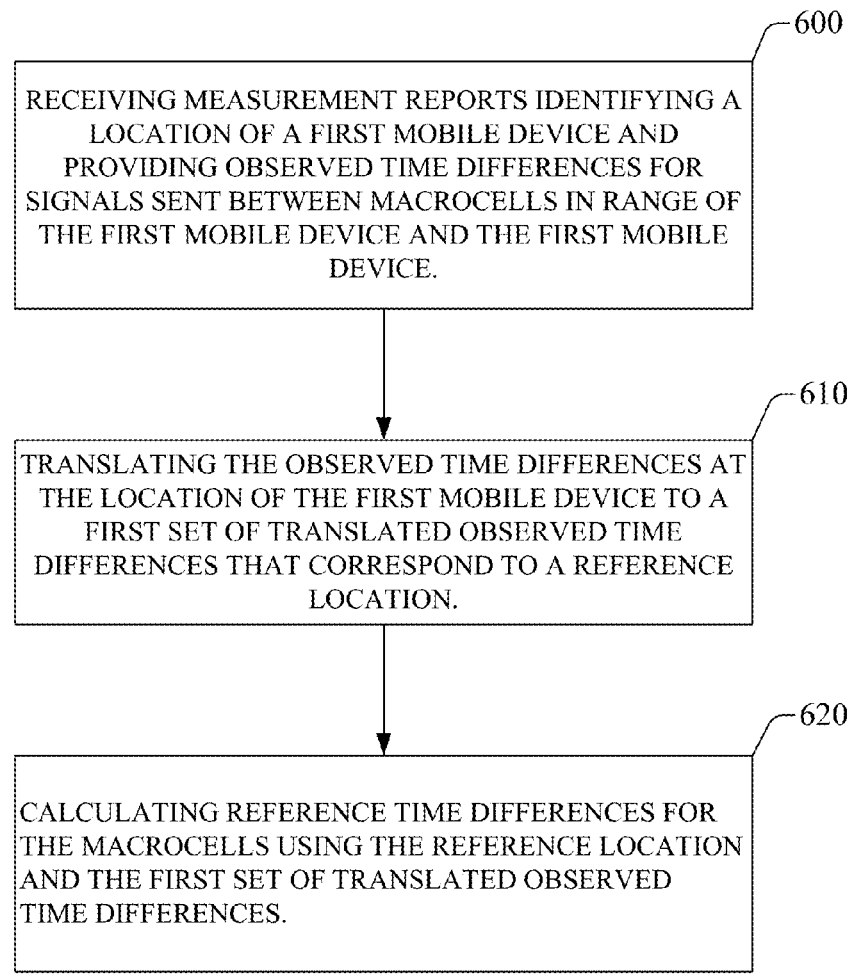
FIG. 6 illustrates an example, non-limiting method for calibrating timing based location systems in accordance with the subject disclosure.
Figure 7:
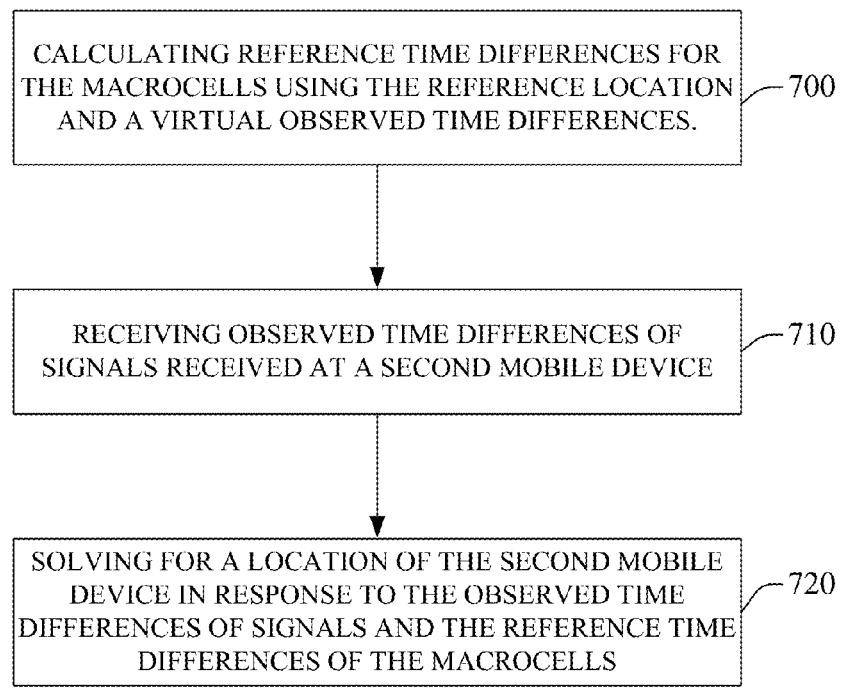
FIG. 7 illustrates an example, non-limiting method for locating mobile devices in accordance with the subject disclosure.

FIGS. 6 and 7 illustrate methods and/or flow diagrams in accordance with the disclosed subject matter. For simplicity of explanation, the methods are depicted and described as a series of acts. It is to be understood and appreciated that the subject embodiments is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6, illustrated is an example, non-limiting process for calibrating timing based location systems in accordance with the subject disclosure. At 600, measurement reports identifying a location of a first mobile device and providing observed time differences for signals sent between macrocells in range of the first mobile device and the first mobile device can be received. The measurement reports can be uploaded by a handset agent on the mobile device to an internet server, where they can be retrieved by the core network. The handset agent can include in the uploaded data file the location coordinates of the mobile device as obtained by the GPS receiver on the mobile device.

The data file can also include the observed time differences between the mobile device and the macrocells. The macrocells can periodically send out signals that can be received by mobile devices in range of the macrocells. The signals can contain code that can identify the macrocell that sent the signal. Each macrocell can have a unique signature, so that the signal can be positively identified as belonging to a specific macrocell. The mobile device can analyze the signals when they are received, and compare the times of receipt. When signals arrive at different times that can indicate that the signals had different distances to travel, and thus the relative distances of the macrocells can be determined. These time differences are the observed time differences and there can be an observed time difference for each macrocell within range of the mobile device. Multiple measurement reports can also be received from many mobile devices.

At 610, the observed time differences for each of the mobile devices at each of their respective locations can be translated to a set of translated observed time differences that correspond to a reference location. The reference location can be a defined location, and a function can be applied to translate the observed time differences for the mobile devices to virtual observed time differences that correspond to the reference location. Since the location of the reference location is known in relation to the mobile devices, and the location of the macrocells are known as well, the observed time differences can be translated to virtual observed time differences for virtual signals that would have been observed if there was a mobile device at the reference location. The virtual translated observed time differences can then be averaged.

At 620, reference time differences for the macrocells using the reference location and the translated observed time differences can be calculated. The distance between the macrocells and the reference location can be determined and since signals between the macrocells and reference location travel at a constant speed c, the expected time it takes for a signal from each macrocell to arrive at the reference location can be determined. The expected time duration for a signal sent from the macrocells can be compared to the actual time based on the observed time differences to determine the deviation of the signals from a baseline. This deviation is the reference time difference which can compensate for the unsynchronized signals from the macrocells.

Referring now to FIG. 7, illustrated is an example, non-limiting method for locating mobile devices in accordance with the subject disclosure. At 700, a reference time difference can be calculated as a function of the reference location and the averaged virtual observed time differences. At 710, observed time differences between the macrocells and another mobile device can be received. At 720 the reference time differences that correspond to the macrocells can be used, as well as the observed time differences at the other mobile device to solve for a location of the other mobile device. Subtracting the reference time differences from the observed time differences can yield actual time differences for signals sent between the macrocells and the mobile device. Using the actual time difference with the known locations of macrocells, it can be possible to use the method of multilateration or hyperbolic positioning which uses time difference on arrival (TDOA) equations to solve for the location of mobile device.

Figure 8:
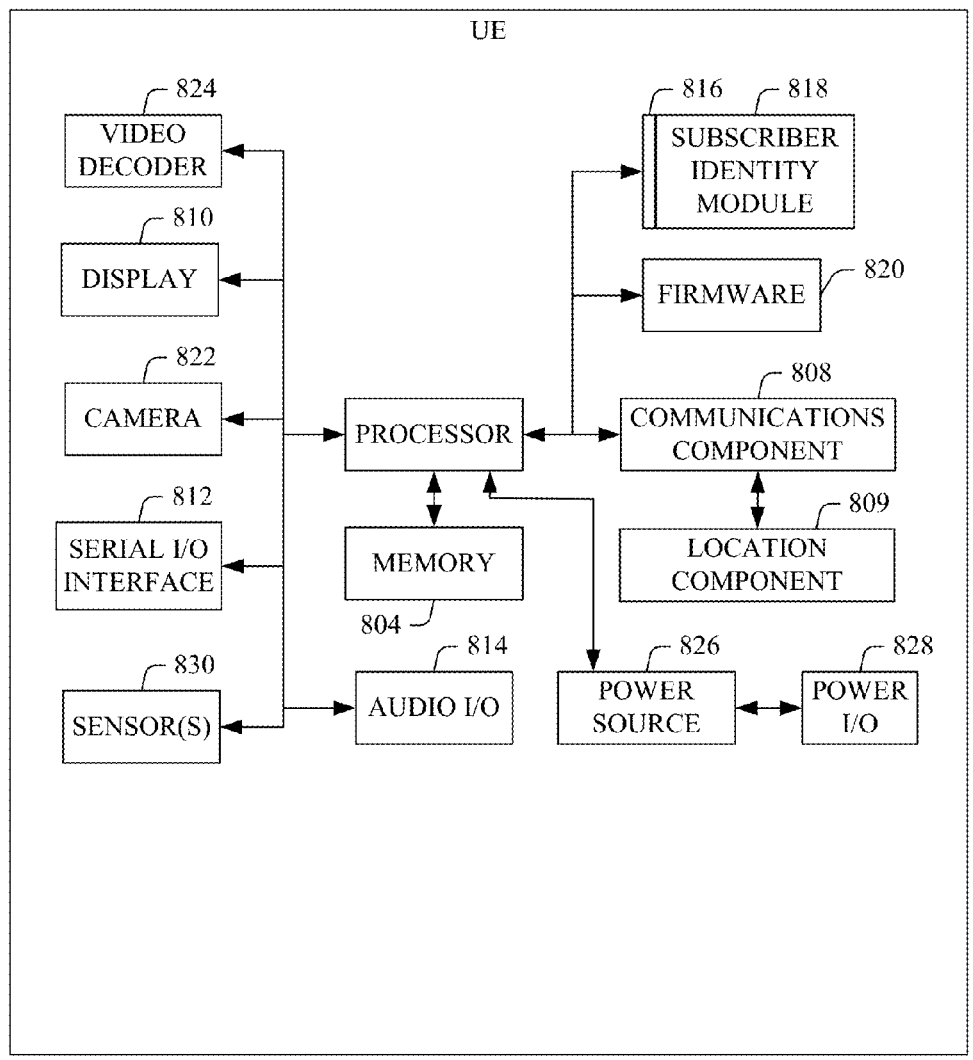
FIG. 8 illustrates a block diagram of a user equipment (UE) suitable for collecting and reporting observed time differences in accordance with the subject disclosure.

Referring now to FIG. 8, there is illustrated a block diagram of a UE 800 that reduces RNC load, based on a user interface (UI) in accordance with the various embodiments. The UE 800 can include a processor 802 for controlling all onboard operations and processes. A memory 804 can interface to the processor 802 for storage of data and one or more applications 806 being executed by the processor 802. A communications component 808 can interface to the processor 802 to facilitate wired/wireless communication with external systems (e.g., femtocell and macro cell). The communications component 808 interfaces to a location component 809 (e.g., GPS transceiver) that can facilitate location detection of the UE 800. Note that the location component 809 can also be included as part of the communications component 808.

The UE 800 can include a display 810 for displaying content downloaded and/or for displaying text information related to operating and using the device features. A serial I/O interface 812 is provided in communication with the processor 802 to facilitate serial communication (e.g., USB, and/or IEEE 1394) via a hardwire connection. Audio capabilities are provided with an audio I/O component 814, which can include a speaker for the output of audio signals related to, for example, recorded data or telephony voice data, and a microphone for inputting voice signals for recording and/or telephone conversations. In addition, sensor(s) 830 can be included to detect usage activity of the UE 800 and/or to detect position, motion and/or orientation of the UE 800.

The UE 800 can include a slot interface 816 for accommodating a subscriber identity module (SIM) 818. Firmware 820 is also provided to store and provide to the processor 802 startup and operational data. The UE 800 can also include an image capture component 822 such as a camera and/or a video decoder 824 for decoding encoded multimedia content. The UE 800 can also include a power source 826 in the form of batteries, which interfaces to an external power system or charging equipment via a power I/O component 828. In addition, the UE 800 can be substantially similar to and include functionality associated with mobile devices 102, 202, 308, 310, 402 and 502 described herein.

Figure 9:
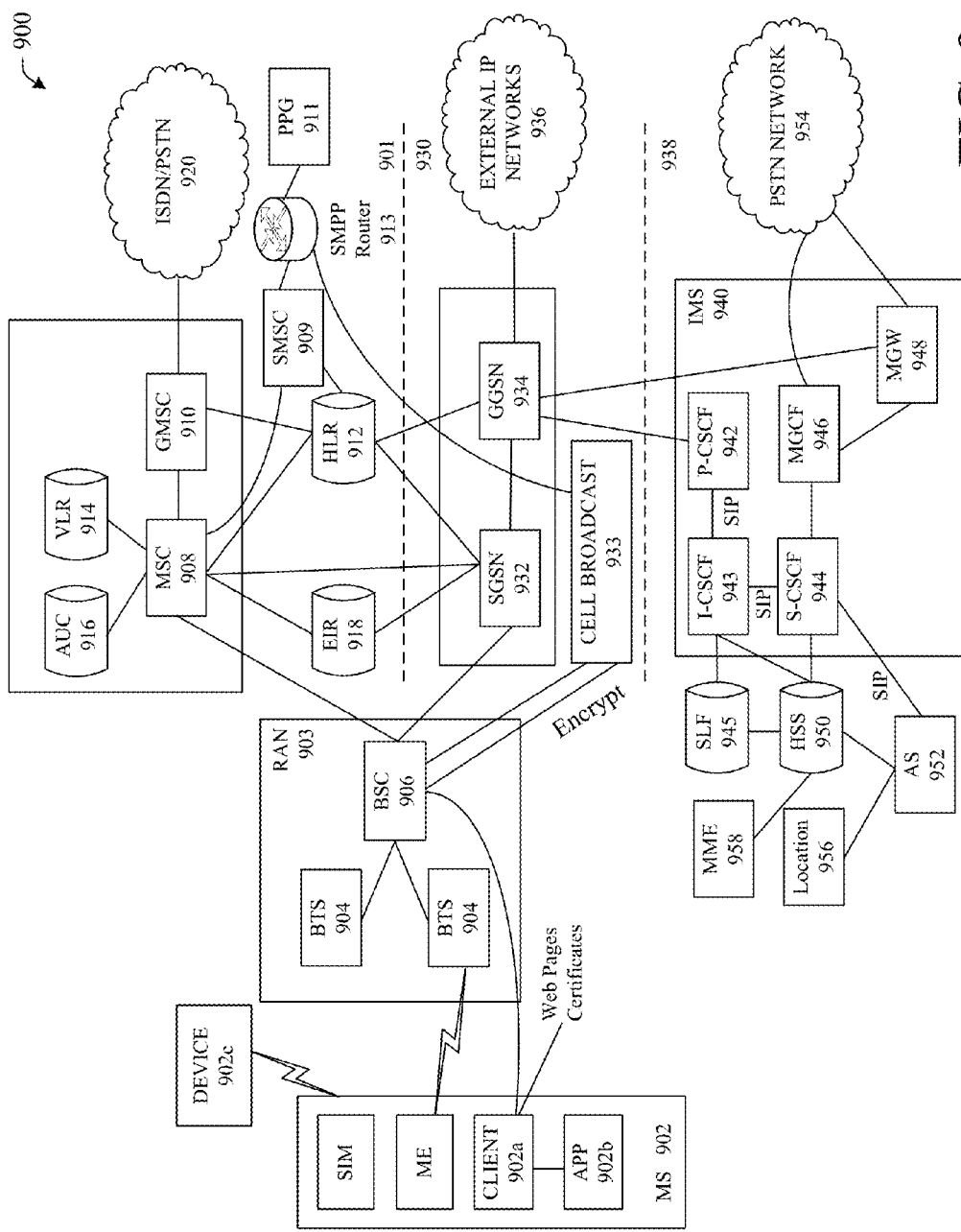
FIG. 9 illustrates a Global System for Mobile Communications (GSM)/General Packet Radio Service (GPRS)/Internet protocol (IP) multimedia network architecture that can employ the disclosed architecture.

Now turning to FIG. 9, such figure depicts an example GSM/GPRS/IP multimedia network architecture 900 that can employ the disclosed communication architecture. In particular, the GSM/GPRS/IP multimedia network architecture 900 includes a GSM core network 901, a GPRS network 930 and an IP multimedia network 938. The GSM core network 901 includes a Mobile Station (MS) 902, at least one Base Transceiver Station (BTS) 904 and a Base Station Controller (BSC) 906. The MS 902 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 902 includes an embedded client 902a that receives and processes messages received by the MS 902. The embedded client 902a can be implemented in JAVA or another programming language and is discuss more fully below. It can be appreciated that MS 902 can be substantially similar to mobile devices 102, 202, 308, 310, 402, 502, and UE 900, and can include functionality described with respect to mobile devices 102, 202, 308, 310, 402 and 502 in systems 100-500 and 900.

The embedded client 902a communicates with an application 902b (e.g., application(s) 202) that provides services and/or information to an end user. Additionally or alternately, the MS 902 and a device 902c can be enabled to communicate via a short-range wireless communication link, such as BLUETOOTH®. As one of ordinary skill in the art would recognize, there can be an endless number of devices 902c that use the SIM within the MS 902 to provide services, information, data, audio, video, etc. to end users.

The BTS 904 is physical equipment, such as a radio tower, that enables a radio interface to communicate with the MS 902. Each BTS can serve more than one MS. The BSC 906 manages radio resources, including the BTS. Moreover, the BSC 906 can be substantially similar to macrocells 104, 106, and 108 and etc., disclosed herein. The BSC and BTS components, in combination, are generally referred to as a base station (BSS) or radio access network (RAN) 903.

The GSM core network 901 also includes a Mobile Switching Center (MSC) 908, a Gateway Mobile Switching Center (GMSC) 910, a Home Location Register (HLR) 912, Visitor Location Register (VLR) 914, an Authentication Center (AuC) 916, and an Equipment Identity Register (EIR) 918. The MSC 908 performs a switching function for the network. The MSC also performs other functions, such as registration, authentication, location updating, handovers, and call routing. The GMSC 910 provides a gateway between the GSM network and other networks, such as an Integrated Services Digital Network (ISDN) or Public Switched Telephone Networks (PSTNs) 920. In other words, the GMSC 910 provides interworking functionality with external networks.

The HLR 912 is a database or component(s) that comprises administrative information regarding each subscriber registered in a corresponding GSM network. The HLR 912 also includes the current location of each MS. The VLR 914 is a database or component(s) that contains selected administrative information from the HLR 912. The VLR contains information necessary for call control and provision of subscribed services for each MS currently located in a geographical area controlled by the VLR. The HLR 912 and the VLR 914, together with the MSC 908, provide the call routing and roaming capabilities of GSM. The AuC 916 provides the parameters needed for authentication and encryption functions. Such parameters allow verification of a subscriber's identity. The EIR 918 stores security-sensitive information about the mobile equipment.

A Short Message Service Center (SMSC) 909 allows one-to-one Short Message Service (SMS) messages to be sent to/from the MS 902. A Push Proxy Gateway (PPG) 911 is used to "push" (e.g., send without a synchronous request) content to the MS 902. The PPG 911 acts as a proxy between wired and wireless networks to facilitate pushing of data to the MS 902. A Short Message Peer to Peer (SMPP) protocol router 913 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 902 sends a location update including its current location information to the MSC/VLR, via the BTS 904 and the BSC 906. The location information is then sent to the MS's HLR. The HLR is updated with the location information received from the MSC/VLR. The location update also is performed when the MS moves to a new location area. In one aspect, the location update is periodically performed to update the database as location-updating events occur.

The GPRS network 930 is logically implemented on the GSM core network architecture by introducing two packet-switching network nodes, a serving GPRS support node (SGSN) 932, a cell broadcast and a Gateway GPRS support node (GGSN) 934. The SGSN 932 is at the same hierarchical level as the MSC 908 in the GSM network. The SGSN controls the connection between the GPRS network and the MS 902. The SGSN also keeps track of individual MS's locations, security functions, and access controls.

A Cell Broadcast Center (CBC) 933 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 934 provides a gateway between the GPRS network and a public packet network (PDN) or other IP networks 936. That is, the GGSN provides interworking functionality with external networks, and sets up a logical link to the MS through the SGSN. When packet-switched data leaves the GPRS network, it is transferred to an external TCP-IP network 936, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN. In a GSM/GPRS network, GPRS services and GSM services can be used in parallel. A GPRS network 930 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 938 was introduced with 3GPP Release 5, and includes an IP multimedia subsystem (IMS) 940 to provide rich multimedia services to end users. A representative set of the network entities within the IMS 940 are a call/session control function (CSCF), a media gateway control function (MGCF) 946, a media gateway (MGW) 948, and a master subscriber database, called a home subscriber server (HSS) 950. The HSS 950 can be common to the GSM network 901, the GPRS network 930 as well as the IP multimedia network 938.

The IP multimedia system 940 is built around the call/session control function, of which there are three types: an interrogating CSCF (I-CSCF) 943, a proxy CSCF (P-CSCF) 942, and a serving CSCF (S-CSCF) 944. The P-CSCF 942 is the MS's first point of contact with the IMS 940. The P-CSCF 942 forwards session initiation protocol (SIP) messages received from the MS to an SIP server in a home network (and vice versa) of the MS. The P-CSCF 942 can also modify an outgoing request according to a set of rules defined by the network operator (for example, address analysis and potential modification).

The I-CSCF 943 forms an entrance to a home network and hides the inner topology of the home network from other networks and provides flexibility for selecting an S-CSCF. The I-CSCF 943 can contact a subscriber location function (SLF) 945 to determine which HSS 950 to use for the particular subscriber, if multiple HSS's 950 are present. The S-CSCF 944 performs the session control services for the MS 902. This includes routing originating sessions to external networks and routing terminating sessions to visited networks. The S-CSCF 944 also decides whether an application server (AS) 952 is required to receive information on an incoming SIP session request to ensure appropriate service handling. This decision is based on information received from the HSS 950 (or other sources, such as an application server 952). The AS 952 also communicates to a location server 956 (e.g., a Gateway Mobile Location Center (GMLC)) that provides a position (e.g., latitude/longitude coordinates) of the MS 902. The mobility management entity (MME) 958 provides authentication of a user by interacting with the HSS 950 in LTE networks.

The HSS 950 contains a subscriber profile and keeps track of which core network node is currently handling the subscriber. It also supports subscriber authentication and authorization functions (AAA). In networks with more than one HSS 950, a subscriber location function provides information on the HSS 950 that contains the profile of a given subscriber.

The MGCF 946 provides interworking functionality between SIP session control signaling from the IMS 940 and ISUP/BICC call control signaling from the external GSTN networks (not shown). It also controls the media gateway (MGW) 948 that provides user-plane interworking functionality (e.g., converting between AMR- and PCM-coded voice). The MGW 948 also communicates with a PSTN network 954 for TDM trunks. In addition, the MGCF 946 communicates with the PSTN network 954 for SS7 links.

Figure 10:
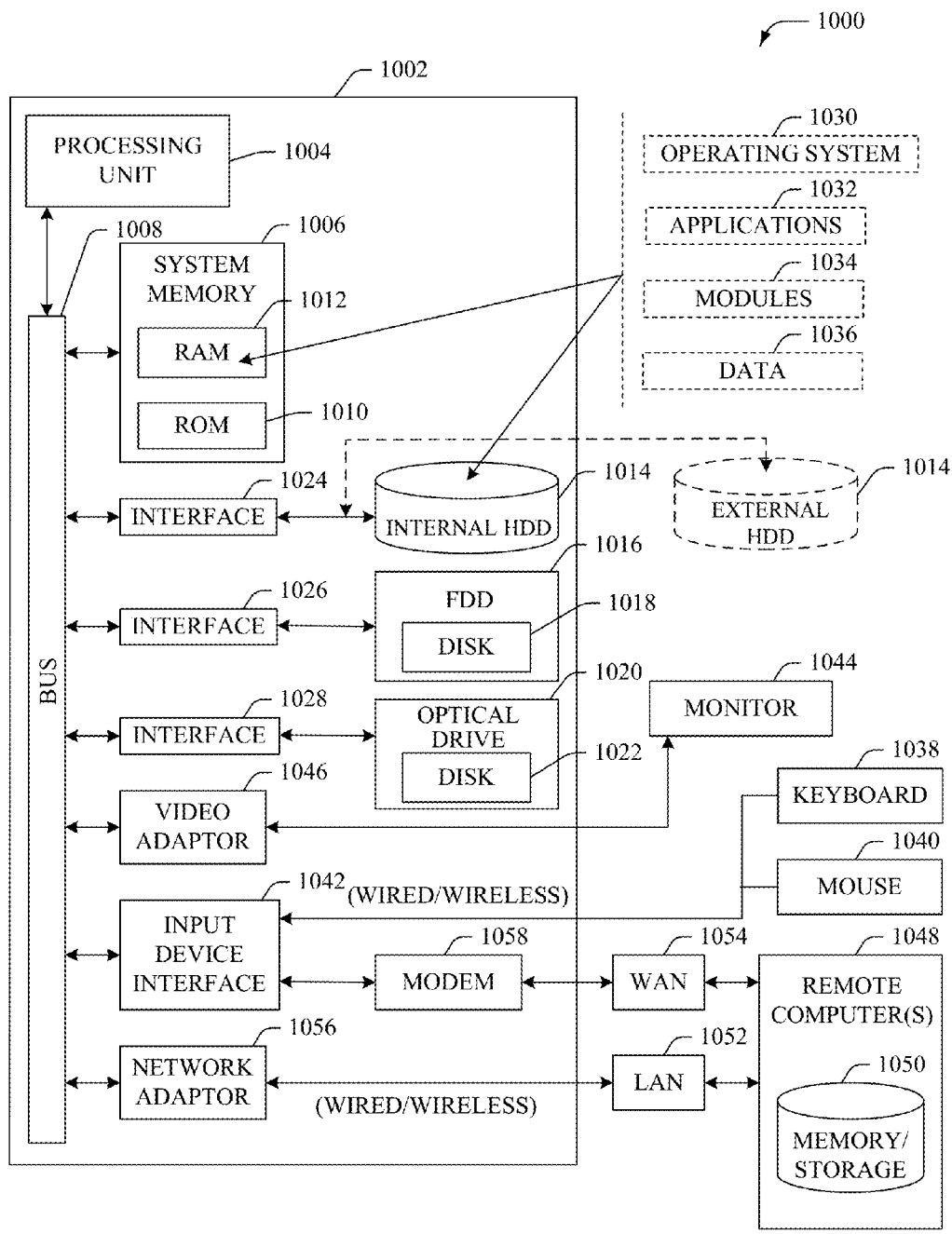
FIG. 10 illustrates a block diagram of a computer operable to execute the disclosed communication architecture.

Referring now to FIG. 10, there is illustrated a block diagram of a computer operable to execute the disclosed communication architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Program modules can include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer can include other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and can include many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "interface," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    receiving, by a system comprising a processor, measurement report data representing a location of a first mobile device and observed time differences for signals that were received by the first mobile device and sent from macrocell devices in range of the first mobile device, wherein the location represents the location of the first mobile device at a time corresponding to the observed time differences being determined and wherein an observed time difference of the observed time differences is a difference between a first time indicating when a signal of the signals was sent from a macrocell device and a second time determined based on when the signal was received at the first mobile device;
    translating, by the system, the observed time differences that correspond to the location to a set of translated observed time differences that correspond to a reference location, wherein the reference location and the location are different from each other;
    determining, by the system, reference time differences for the macrocell devices as a function of the reference location and the set of translated observed time differences;
    receiving, by the system, second observed time differences of signals from a second mobile device, wherein the second mobile device is different from the first mobile device;
    calibrating the second observed time differences of signals with the reference time differences to create calibrated second observed time differences of signals wherein the calibrating the second observed time differences further comprises subtracting the reference time differences from the second observed time differences of signals for the macrocell devices; and
    determining, by the system, a second location of the second mobile device based on the calibrated second observed time differences of signals.

2. The method of claim 1, wherein the determining the reference time differences comprises determining the reference time differences using locations of the macrocell devices.

3. The method of claim 1, wherein the translating the observed time differences comprises generating virtual observed time differences for virtual signals sent from the macrocell devices to the reference location, wherein the virtual observed time differences represent time differences that would be observed if the virtual signals were received at the reference location.

4. The method of claim 1, wherein the receiving the measurement report data comprises receiving the measurement report data from the first mobile device via a network device configured for communication according to an internet protocol.

5. The method of claim 1, wherein the receiving the measurement report data representing the location of the first mobile device comprises receiving coordinates from an agent that executes on the first mobile device.

6. The method of claim 1, wherein the set of translated observed time differences is a first set of translated observed time differences, the receiving comprises receiving the measurement report data from a plurality of mobile devices and the translating comprises translating a plurality of observed time differences for the plurality of mobile devices to a second set of translated observed time differences that correspond to the reference location, and further comprising:
    averaging, by the system, the second set of translated observed time differences; and
    determining, by the system, a second set of reference time differences based on the averaging the second set of translated observed time differences and the reference location.

7. The method of claim 1, wherein the reference time differences for the macrocell device are synchronization variations for the macrocell devices.

8. A system, comprising:
    a memory that stores executable instructions; and
    a processor, coupled to the memory, to facilitate execution of the executable instructions to perform operations, comprising:
        receiving a measurement report that represents observed time differences for signals sent to a first mobile device from macrocell devices in range of the first mobile device and represents a location of the first mobile device corresponding to when the signals were received by the first mobile device, wherein the observed time differences represent differences between first times indicating when the signals were sent from the macrocell devices and second times determined based on when the signals were received at the first mobile device;

translating the observed time differences that correspond to the location to a set of translated observed time differences that correspond to a reference location, wherein the reference location and the location are different locations;

determining reference time differences for the macrocell devices as a function of the reference location and the set of translated observed time differences;

receiving second observed time differences of signals from a second mobile device, wherein the second mobile device is different from the first mobile device;

calibrating the second observed time differences with the reference time difference to create calibrated second observed time differences, wherein the calibrating the second observed time differences further comprises subtracting the reference time differences from the second observed time differences of signals for the macrocell devices; and locating the second mobile device based on the calibrated second observed time differences.

9. The system of claim 8, wherein the determining comprises generating the reference time differences based on locations of the macrocell devices.

10. The system of claim 8, wherein the set of translated observed time differences are virtual observed time differences for virtual signals sent from the macrocell devices to the reference location, wherein the virtual observed time differences represent time differences that would be observed if the virtual signals were received at the reference location.

11. The system of claim 8, wherein the receiving the measurement report that represents the location comprises receiving the location of the first mobile device from an agent of the first mobile device.

12. The system of claim 8, wherein the receiving the measurement report comprises collecting measurement reports from a plurality of mobile devices determined to be in range of the macrocell devices.

13. The system of claim 12, wherein the translating comprises translating a plurality of observed time differences from the plurality of mobile devices to a plurality of virtual observed time differences that correspond to the reference location, wherein the plurality of virtual observed time differences represent time differences that would be observed if the virtual signals were received at the reference location.

14. The system of claim 13, wherein the operations further comprise:
averaging the virtual observed time differences as input to determining a second set of reference time differences.

15. The system of claim 8, wherein the operations further comprise:
receiving a primary scrambling code that identifies a macrocell device of the macrocell devices that corresponds to an observed time difference of the observed time differences.

16. The system of claim 8, wherein the measurement report comprises an indication of a strength of a signal of the signals.

17. A tangible computer-readable device comprising computer-executable instructions that, in response to execution, cause a computing device comprising a processor to perform operations, comprising:
receiving a measurement report representing observed time differences for signals received at a first mobile device and sent from macrocell devices in range of the first mobile device and representing a location of the first mobile device where the observed time differences were obtained, wherein an observed time difference of the observed time differences is a difference between a first time indicating when a signal of the signals was sent from a macrocell device and a second time determined based on when the signal was received at the first mobile device;

translating the observed time differences to a set of translated observed time differences that correspond to the location that correspond to a reference location, wherein the reference location is different than the location;

determining reference time differences for the macrocell devices based on the reference location and the set of translated observed time differences;

receiving second observed time differences of signals from a second mobile device, wherein the second mobile device is different from the first mobile device;

calibrating the second observed time differences with the reference time differences to create calibrated second observed time differences, wherein the calibrating the second observed time differences further comprises subtracting the reference time differences from the second observed time differences of signals for the macrocell devices; and locating the second mobile device based on the calibrated second observed time differences.

18. The tangible computer-readable device of claim 17, wherein the operations further comprise:
determining virtual time differences for the reference location and the macrocell devices, wherein the virtual time differences are a function of distances between the reference location and the macrocell devices; and
determining reference time deviations between reference time differences and the virtual time differences.

19. The tangible computer-readable device of claim 18, wherein the operations further comprise:
calibrating the second observed time differences based on the reference time deviations.

* * * * *